United States Patent [19]
Brown

[11] 3,920,373
[45] Nov. 18, 1975

[54] LIP FOLDING APPARATUS

[76] Inventor: Gaylord William Brown, Beaverton, Mich. 48612

[22] Filed: Sept. 16, 1974

[21] Appl. No.: 506,322

[52] U.S. Cl. ............... 425/392; 429/397; 264/297; 264/310; 264/319
[51] Int. Cl.² ..................... B29C 17/02; B29D 7/22
[58] Field of Search ........... 425/385, 329, 367, 384, 425/340, 391, 392, 397, 402, 412, 148, 305

[56] References Cited
UNITED STATES PATENTS

| | | |
|---|---|---|
| 3,337,917 | 8/1967 | Brown.................................. 425/391 |
| 3,339,005 | 8/1967 | Brown et al. ................... 425/384 X |
| 3,355,536 | 11/1967 | Midgley et al. .................. 425/340 X |
| 3,548,457 | 12/1970 | Kulig................................. 425/392 |

*Primary Examiner*—J. Howard Flint, Jr.
*Attorney, Agent, or Firm*—John J. Swartz

[57] ABSTRACT

Apparatus for folding deformable projecting rims or flanges on individual containers of a stack of nested containers or the like comprising: mechanism for heating the rims, a rim folding roller having a spiral rim folding groove for receiving and folding the heated rims, and an endless belt positioned about a portion of the roller and traveling in a path so as to tangentially engage the containers and maintain the rims in the groove under such force as to effect conjoint rotation and relative axial movement of the containers and the rim folding roller.

20 Claims, 14 Drawing Figures

LIP FOLDING APPARATUS

BACKGROUND OF THE INVENTION

This invention relates to high speed rim folding apparatus for folding the rims of plastic containers arranged in nested relation.

In the manufacture of polystyrene, polyethylene and other plastic containers such as disposable cups, bowls and the like, the containers are molded in a sheet of plastic material. When the containers are then cut out of the plastic web, circumferential flanges or rims extend about the container mouths and present sharp edges. Apparatus has been provided heretofore for curling the rims of such containers when they are stacked in nested relation.

In rim curling apparatus of the type disclosed in U.S. Pat. No. 3,337,919 granted Aug. 29, 1967, the stack of containers must rotate at a very high velocity. With the prior art machine, in order to increase the output, it is necessary to increase the rotational speed of the stack. If the rotational speed of the stack exceeds a predetermined speed, i.e., 2,000 r.p.m. it becomes difficult to control the position of the stack during rotation. The container rim folding apparatus diclosed herein and in the present inventors copending patent application Ser. No. 506,406 filed in the United States Patent Office on Sept. 16, 1974, entitled Apparatus for folding Container Rims, incorporated herein by reference, will increase the output while maintaining the rotational speed of the stack at a controllable level. With such apparatus the output of the machine can also be increased over the output of known rim curling mechanism although the rotational speed of the stack is decreased.

Apparatus constructed according to the present invention employs a rotatable rim folding member having a plurality of spiral grooves about the periphery thereof for receiving the rims on successive containers provided in a stack of containers. The helix angle of the multiple flights which define rim receiving, folding grooves is larger than the helix angle which can be accommodated on a single groove, rim curling member. Accordingly, it is an object of the present invention to provide apparatus of the type described having a rim folding member provided with a plurality of flights defining multiple, rim receiving, rim folding grooves about the peripheral surface thereof.

In the prior art machines, the rotational axis of the rim curling member is parallel to the axis of the stack. The prior art rim curling members incorporate compression zones of changing dimensions at the lead ends of the grooves for compressing the rims so that they will become entrapped within the spiral grooves. The apparatus constructed according to the present invention folds the rim within only one revolution of the container after the rim is received in the groove and incorporates a rim forming member which is angularly offset relative to the rotational axis of the stack such that the portions of the grooves which receive the rims lie in planes substantially perpendicular to the axis of the stack. This construction eliminates the necessity for compression zones and thereby minimizes the machining attendant to a rim curling member having such a compression zone. Accordingly, it is another object of the present invention to provide rim forming apparatus having a rotatable, rim forming member in which the rim forming groove has substantially the same cross sectional area throughout the length thereof.

It is still another object of the present invention to provide apparatus of the type described in which the cups are fed mouth first to the rim forming member.

Yet another object of the present invention is to provide apparatus of the type described which can incorporate a small diameter rim folding member.

Prior art lip curling machinery has incorporated a plurality of arcuately arranged, polished, stainless steel or chromium plated rolls spaced about the grooved curling member for forcing the rims into the curling groove on the curling member. The prior art rolls, which were disposed substantially parallel to the axis of the container stack, were driven and high polished to minimize the resistance to axial movement of the stack as it passed axially through the rim curling member. It is an object of the present invention to provide a machine of the type described employing at least a pair of belt supporting rollers, arcuately arranged about the rim curling roller, mounting a container supporting traveling belt for receiving the containers and maintaining the rims in the groove, while permitting substantially uninhibited axial movement of the containers.

It is another object of the present invention to provide rim folding apparatus of the type described including a compressing belt traveling tangentially to the container rim in the folding groove.

It is a further object of the present invention to provide rim folding apparatus of the type described including an endless, container supporting belt, including a container supporting portion traveling in a helical path of travel to rotate and concurrently forward the container as the rim is being folded.

Another object of the present invention is to provide apparatus of the type described having a rim heating section upstream of a rim folding section and a temperature controlled roller disposed in the heating section for supporting and rotating a container.

The present apparatus accelerates the time required to complete rim formation after the rim contacts the forming roll and thus there is less cooling time prior to completion of the rim. The temperature of the plastic is less critical in the present apparatus. Accordingly another object is to provide apparatus of the type described which will minimize the criticality of plastic cup temperature.

Another object of the present invention is to provide a rim folding machine of a type described which can be angularly adjusted to a vertically inclined position such that gravity will aid the feed of the stack through the machine.

Cup counting and separating mechanism is associated with a machine of the type disclosed herein for counting the cups and separating them into stacks and includes a counter of the type which is generally actuated by the cups as they move past the mechanism. The container supporting belt constructed according to the present invention grips the containers along a large part of the container circumference and thus imparts greater driving force to the containers than the force which is imparted by support rollers gripping the containers. The system thus operates to provide increased axial driving force to actuate the counters without container slippage and thus an accurate container count can be achieved. If the container count is not accurate, the manufacturer will generally put extra containers in each stack to insure that at least the minimum number is provided to the supplier. This procedure is costly. An accurate container count is also of particular importance in vending machines because the product is generally paid for by the cup count. Accordingly, it is another object to provide apparatus which includes a container supporting belt that will impart increased driving force to the container.

These and other objects of the present invention will become apparent to those of ordinary skill in the art as the description thereof proceeds.

SUMMARY OF THE INVENTION

Apparatus for folding deformable projecting rims or flanges provided on individual containers of a stack of nested containers or the like comprising nmechanism for heating the rims to a deformable state, a rim turning roller having a spiral rim groove for receiving and folding the heated rims radially inwardly mechanism for rotating the roller, and a movable, compressing belt positioned about a portion of the roller such a distance and traveling in a path so as to tangentially engage the containers and maintain the rims in the groove under such force as to effect conjoint rotation and relative axial movement of the containers and the rim folding roller.

The present invention may more readily be understood by reference to the accompanying drawings in which.

Figure 1:
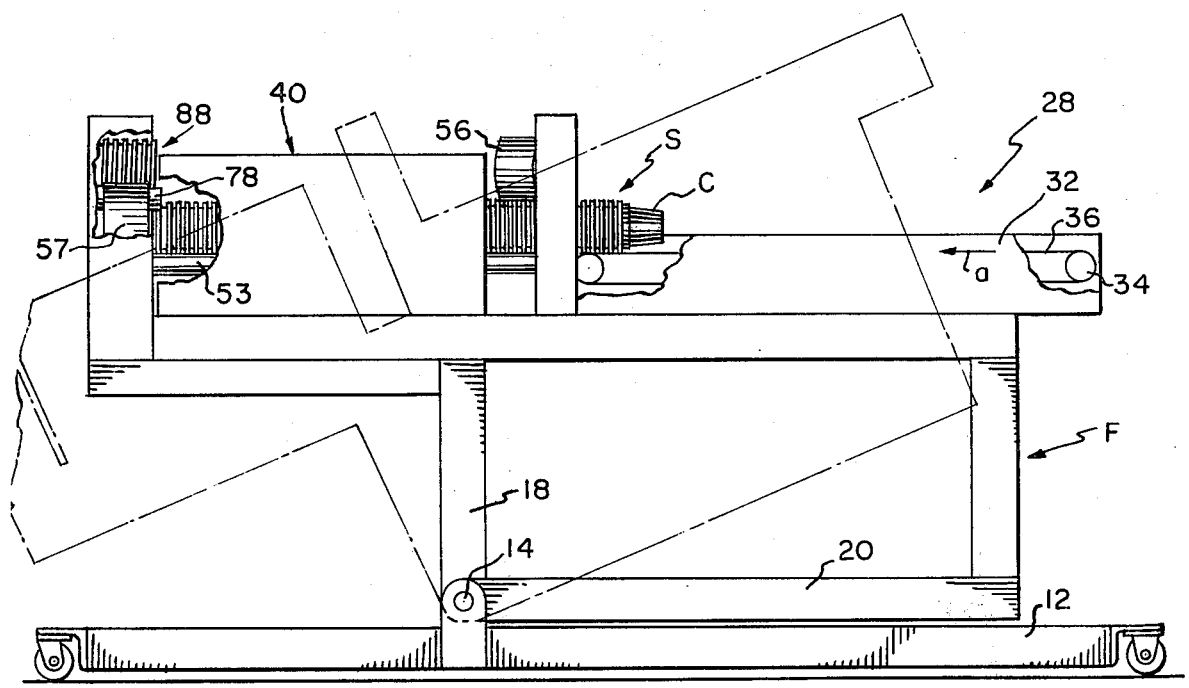
FIG. 1 is a side elevational view of apparatus constructed according to the present invention, part of the heating apparatus being broken away to more particularly illustrate other portions thereof.
Figure 2:
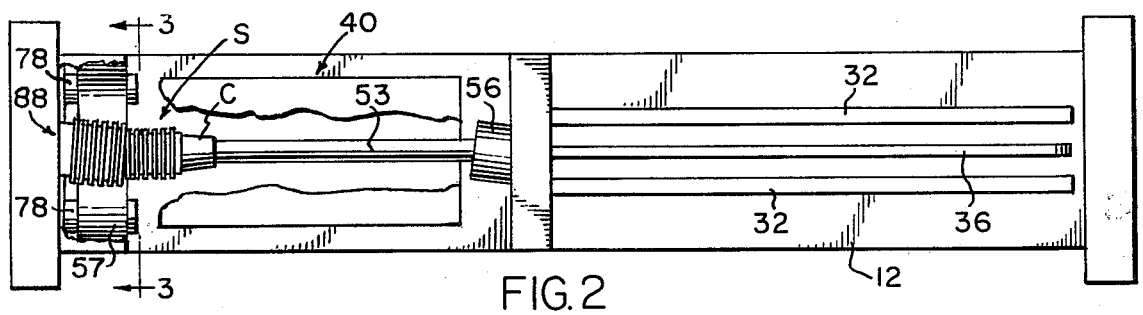
FIG. 2 is a top plan view of the apparatus illustrated in FIG. 1.

Apparatus constructed according to the present invention is mounted on a frame, generally designated F, pivotally mounted on a base 12 via a pivot pin 14. The frame F includes a horizontal bed 16 mounted on upstanding posts 18 spanned by horizontal connecting bars 20 (FIG. 1).

A pair of axially spaced apart end frame members 22 and 23, mounted atop the bed 16, are spanned by stringers 26. A stack delivery conveyor, generally designated 28 (FIG. 1) is provided for delivering a stack, generally designated S, of containers C, the conveyor 28 is mounted atop the bed 16 and includes a pair of generally parallel sidewalls 32, mounting rotatable endrolls 34 around which is trained an endless drive belt 36 traveling in the direction of the arrow $a$.

The container C is a one piece, molded plastic member which is initially cut from a plastic web so as to provide a peripheral flange, web, or rim 38 about the open or mouth end of the container C. The nested containers are fed open end foremost.

Figure 14:
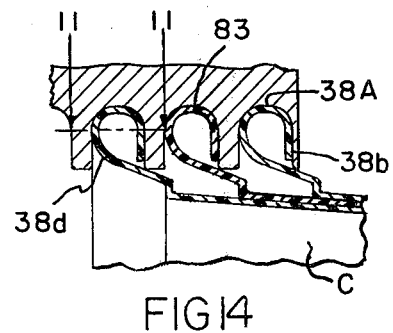
FIG. 14 is a sectional side view illustrating a folded lip.

Apparatus constructed according to the present invention is provided for rolling or folding the rim 38 over on itself (as illustrated in FIG. 14) to provide a bead 38A which will have a folded edge. The conveyor unit 28 delivers the stack S of containers C to a heating station, generally designated 40, at which the rims 38 are heated to a deformable state. Mounted between the end frame members 22 and 23 is a heating unit, generally designated 42, which may be an electric heating unit of the type disclosed in U.S. Pat. No. 3,337,919 and U.S. Pat. No. 3,339,005 both of which are incorporated herein by reference. As described in the aforementioned patents, the heating unit 42 includes two opposed, semi-cylindrical housing sections 44 pivotally mounted on the lower stringer 26 via pairs of arms 46. Each half section 44 includes a handle 44A by means of which the semi-cylindrical sections may be swung on the stringer 26 between spread positions and closed engaging positions enveloping a stack S passing through the heating station 42. The half sections 44 are of such size as to receive and pass a stack S of containers C. A plurality of conventional, electrical resistance heating elements 48 are mounted on the inner-cylindrical surfaces of each half section 44 and may be connected to a suitable source of power such as a 220 volt, 60 volt cycle alternating current. The longitudinal axis of the heating unit 42 is parallel to the axis of the stack S. A plurality of guide rods 50 span the frame members 22 and 24 to support and properly position the stack S as it passes through the heating section 42.

Apparatus, generally designated 52, is provided for rotating while concurrently axially forwarding or driving the stack S of nested containers C mouth first through the heating unit 42 and comprises a forwarding roll 56, formed of soft rubber or the like, journaled on a spindle 58 which is inclined to the longitudinal axis of the heating unit and the longitudinal axis C of the stack S. The spindle 58 is journaled on a yoke 60 which is rotatably mounted on a bracket 60A for rotation about an axis 60B intersecting the stack axis C. The bracket 60A is mounted on the end plate 22 for radial adjustment. The forwarding and rotating apparatus 52 also includes a metal roll 53 having reduced diameter stubshaft ends 53a (FIG. 6) suitably journaled on the frame F. One of the shaft ends 53a mounts a pulley 55 which is driven by a drive belt 64 trained around a drive pulley 65 fixed to a shaft 66. The shaft 66 is driven by an endless drive belt 72 trained around a pulley 75 fixed to the output shaft of an electric motor 68. The roll 53 is generally longitudinally coextensive with the heater 42 but extends slightly beyond the ends thereof.

Figure 5:
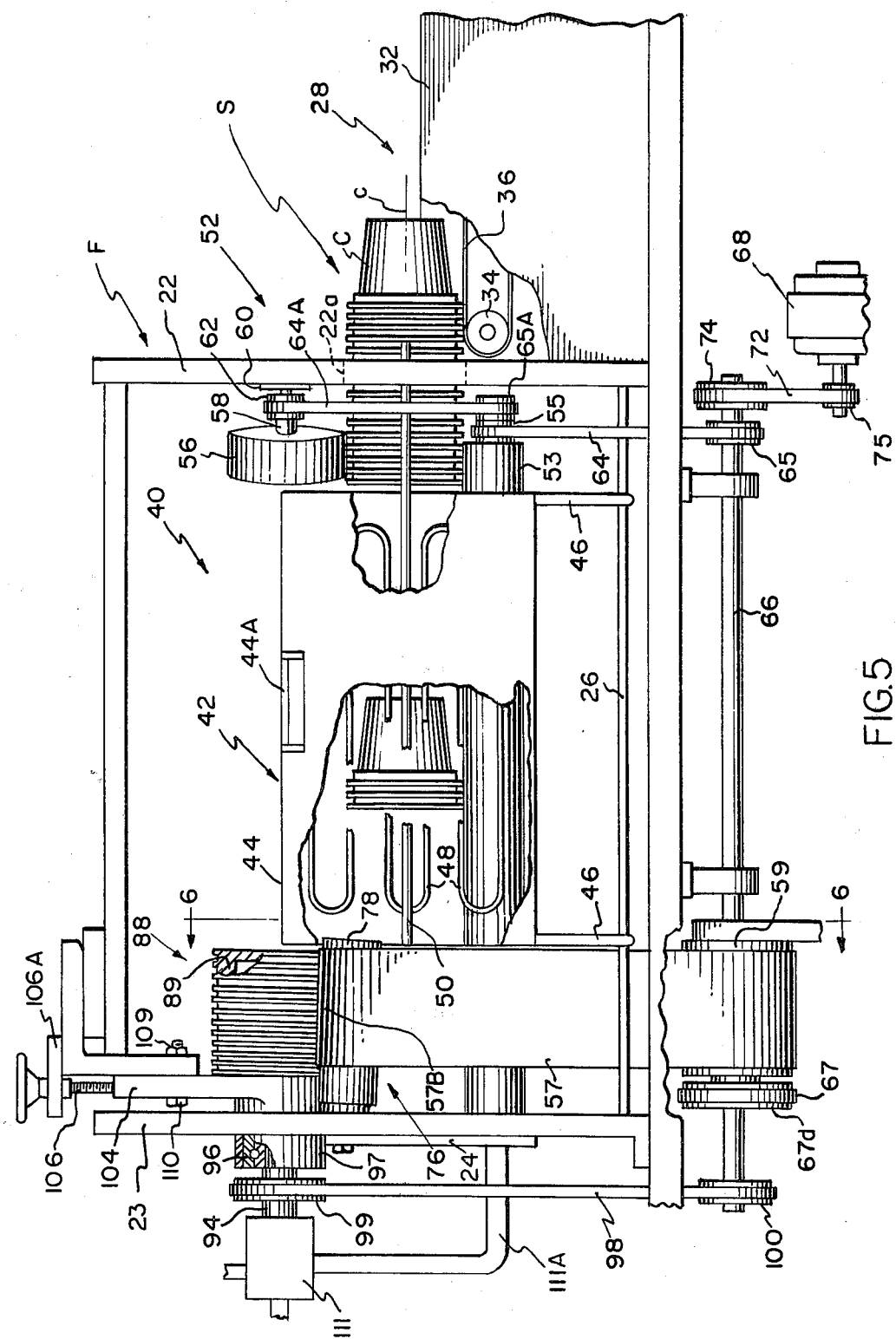
FIG. 5 is an enlarged, side elevational view of a portion of the apparatus illustrated in FIG. 1.

The metal roll 53 may suitably include coaxial internal coolant passages 53b and 53c for passing coolant fluid from a source 111 via a coaxial coupling member 111a (FIG. 5). The heating elements 48 will tend to heat the outside of the roll 53 such that the rims 38 will be excessively heated if the roll 53 is not cooled. The rolls 53 and 56 are diametrically opposed on opposite sides of a stack receiving opening 22a provided in the end plate 22, but the rolls 53 and 56 project radially inwardly beyond the edge of the opening 22a so as to engage the peripheral edge portions of the container rims 38. The drive for the spindle 56a is provided by a drive belt 64a trained around a pulley 62 fixed to the spindle 56a as well as a drive pulley 65A fixed to the shaft 53A. The arrangement of the rubber covered drive roll 56 is such that the inclination of the axis of rotation of the drive roll 56 may be adjusted so as to control the rate at which containers C are rotated and fed to the heating unit 42.

Figure 13:
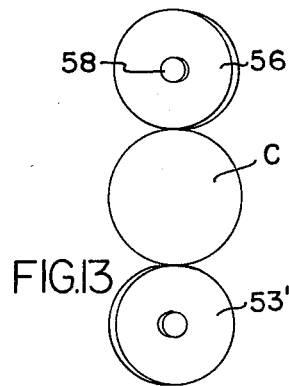
FIG. 13 is a sectional end view of the forwarding and rotating rolls provided in a slightly modified construction.

As illustrated in FIG. 13, a roll 53', identical to the roll 53, may be substituted for the roll 56. The roll 53' is angularly adjustable and mounted identically to the roll 53 and identical parts are identified with identical reference characters.

Control apparatus (not shown) may be provided to interrupt operation of the conveyor 32 and the rolls 56, 53, and 53' to interrupt the supply of containers. Such a system could suitably include a photosensor and time delay system which interrupts the feed if containers become jammed or if a break in container supply occurs.

Figure 7:
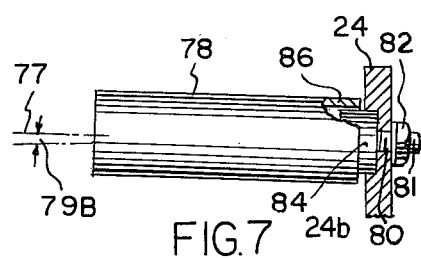
FIG. 7 is an enlarged sectional view taken along the line 7—7 of FIG. 3.
Figure 8:
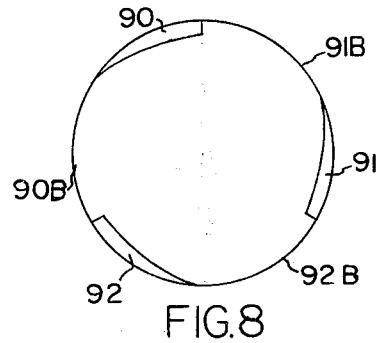
FIG. 8 is an enlarged end view, taken along the line 8—8 of FIG. 9.

Apparatus, generally designated 76, is provided downstream of the heating station 42 for folding the edge portions of the container rims 38 over on themselves to the positions illustrated in FIG. 14. The apparatus 76 includes a mounting plate 24 spanning an opening 23a provided in the plate 23 and fixed to the plate 24 by bolts 23. The apparatus further includes a pair of nonparallel, freely rotatable, belt supporting idler rolls, generally designated 78, spaced about an opening 24a provided in the end plate 24. Each roll member 78 comprises a spindle 80 having a threaded end 81 that is accommodated in an opening formed in the end plate 24 and secured to the latter by a nut 82 (FIG. 7). Rotatably journaled on the spindle 80 via suitable bearings 84 are sleeves 86 which have a substantially uniform external diameter throughout their lengths. The outer surface of the sleeves 86 need not be polished.

Each inner bearing 84 is angularly offset and is received in a machined recess 86 on the inside surface 24b of the plate 24. The rolls 78 are angularly positioned relative to the axis c of the stack S such that the roll axes 77 lie in planes p that are perpendicular to radial planes r intersecting the stack axis c but are inclined relative to the radial planes r by an angle 79B. As viewed in FIG. 6, each roll 78 is identically angularly offset relative to the radial planes r by an angle 79B which is particularly selected such that there is substantially no axial resistance to forward movement of the stack S by the rolls 78.

Figure 3:
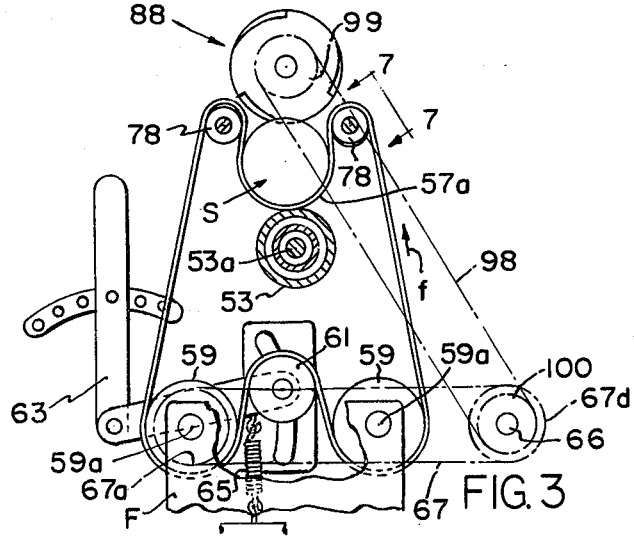
FIG. 3 is a sectional end view, taken along the line 3—3 of FIG. 2.

An endless belt 57 is trained around the rolls 78 as well as a pair of lower rolls 59 (FIG. 3) journaled on the frame F for rotation about their axes 59a. A belt tightener roll 61 is mounted between the rolls 59 on a bell crank 63 which can be adjusted to overcome the force of a spring 65. As illustrated at 57a, the belt encompasses or surrounds the underside of the stack S through an arc approximating 240°. The belt portion 57a between the rolls 78 travels in a helical path to rotate the stacked containers C as well as forward them downstream. The belt 57 is driven in the direction represented by the arrow f by a belt 67 trained around a pulley 67a fixed to one of the shaft spindles 59a and a pulley 67d fixed to the drive shafts 66. By adjustment of the bell crank handle 63, the tension on the belt can be controlled. The belt 57 provides increased support and control of the stack S as the container rims 38 are being folded.

Figure 6:
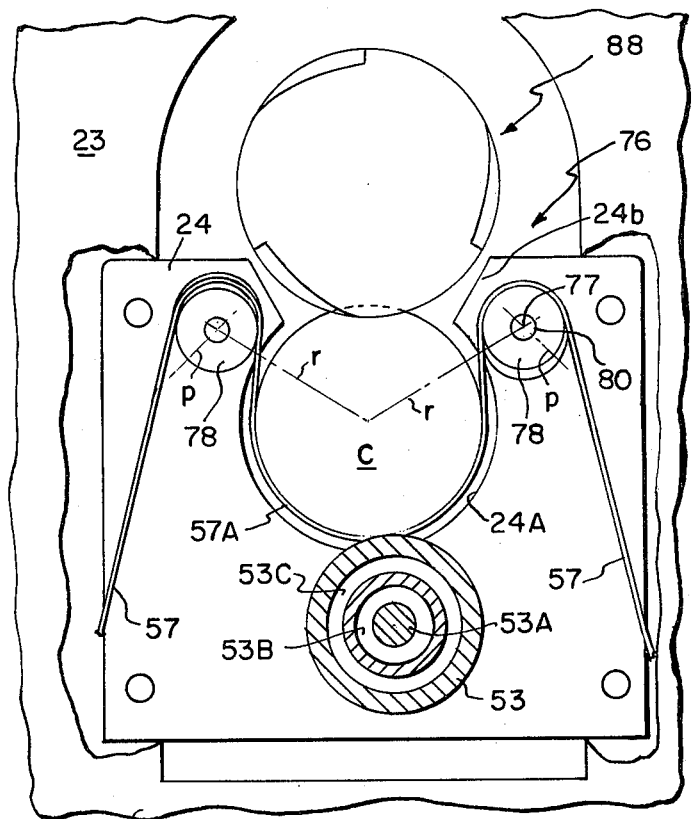
FIG. 6 is a sectional and view taken along the line 6—6 of FIG. 5.
Figure 10:
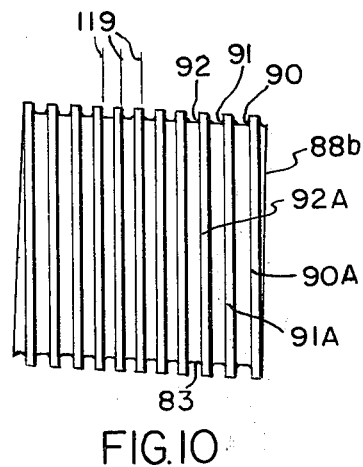
FIG. 10 is an enlarged underplan view of the rim folding roller.

The upper end of the end plate opening 24a is flared outwardly as illustrated at 24b in FIG. 6. Accommodated in the opening 24b at the upper open end of the horseshoe configuration presented by the belt portion 57a is a grooved, rim folding member generally designated 88 comprising a hollow cylinder 89 having an external surface in which is formed a plurality of helical grooves 90, 91, and 92 of substantially uniform depth and width along the full length of the roll 88. The cylinder 89 secured to a spindle 94 journaled in bearings 96 (FIG. 5) mounted in a bearing housing 94 which is received in the end plate opening 24b. The spindle 94 is driven by an endless belt 98 (FIGS. 1 and 10) trained around a pulley 99 fixed to the spindle 94 and a pulley 100 fixed to the drive shaft 66. The bearing housing 97 is provided with a flange 104 that is vertically adjustable by means of an adjustable screw 106 journaled in a bearing block 106A and having threaded engagement with the flange 104. A bolt 109 (FIG. 10) is provided in the flange 104 and a nut 110 is provided on the bolt 106 for clamping the roll 89 in position. A pair of coaxial internal coolant passages are provided in the spindle 94 for passing coolant fluid from a source 111 as described more particularly in the aforementioned patent application.

Figure 9:
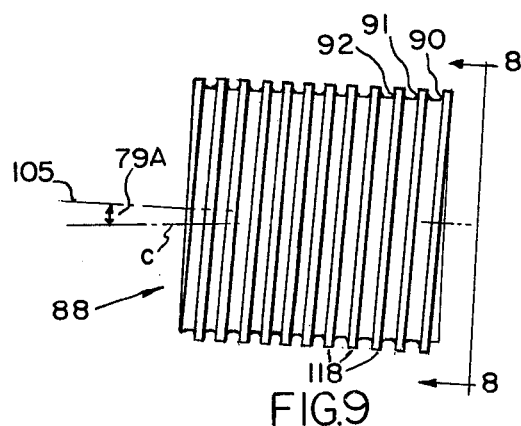
FIG. 9 is an enlarged top plan view of the rim folding roller.

The bracket 104 is positioned such that the rotational axis 195 of the rim folding cylinder 89 is not parallel to the axis c of the stack S but rather is angularly adjusted thereto in a horizontal plane on an angle 79A (FIG. 9) equal to the helix angle of the grooves 90, 91 and 92. In this position, the portions of the lip folding grooves 90, 91 and 92 on th underside of the lip folding member 88 which are right angles to the stack axis c as is best illustrated in FIG. 6. The terminal portions 38b of the rims tangentially engage the bases or roots 83 of the grooves 90, 91, 92 to be forced to a folded position as illustrated at 38A. The screw flight portions which are immediately axially adjacent the tangentially engaged rim portions lie in planes which are perpendicular to the stack axis c.

The helix angle of the flights 118 forming the grooves 90, 91 and 92 is substantially greater than that of a single groove screw.

Figure 12:
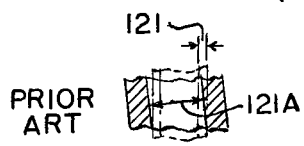
FIG. 12 is a sectional view similar to FIG. 11 illustrating a prior art rim curling roll.
Figure 11:
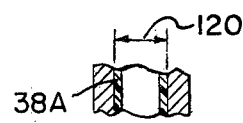
FIG. 11 is a greatly enlarged sectional view, taken along the line 11—11 of FIG. 14.

As is illustrated in FIG. 11, if the axis 105 of the rim folding member 88 is inclined to the stack axis c such that the rim receiving portions 90A, 91A and 92A of the slots 90, 91 and 92 respectively lie in planes 119 perpendicular to the stack axis c, the full slot width 120 is available for receiving the container rims 38. The container rims 38 slip into the slots and thus the compression zones previously associated with such forming rolls can be eliminated. As is illustrated in FIG. 12, if the rim receiving slot portion lies in a plane which is not perpendicular to the stack axis, the effective slot width 120A is reduced by the axial width 121. In such case the rims must be compressed an amount approximating the width 121 so that they are received in the effective slot width 120A. If the rim forming member is positioned parallel to the container stack, the container is rotated through at least part of one revolution before the rim is sufficiently compressed in the compression zone so that it can be received in the slot width 120A. Another revolution of the container is then required to complete curling. Receipt of the rim in the compression zone cools the rim before it is received in the slot width 120A. Throughout a forming cycle the temperature of the roll and thus the cooling rate will vary. The temperature of the container is very critical in the prior art machine since the rim is subjected to cooling through two revolutions as opposed to one revolution in the present machine. The belt supporting rolls 78 are positioned, relative to the axis c and the radial planes r, at angles 79B, equal to one-half the helix angle. This construction causes the container supporting belt to travel in a path which traces any one of the helical grooves 90, 91, and 92 on the outside of the cylinder 78. The belt portion 57a forces the rims 38 into the slots 90, 91 and 92 and drives the rims in such paths that the rims 38 follow helical paths on the roll 78.

In at least one prior art rim curling machine, the curling screw has a fairly large diameter to keep the helix angle small so that containers will travel axially past polished crowing rolls more easily. For a given set of circumstances, smaller diameter rolls have a large helix angle. With the rim folding member constructed and mounted according to the present invention, the diameter of the rim folding member may be decreased in comparison to the diameter of prior art curling roll members.

OPERATION

Figure 4:
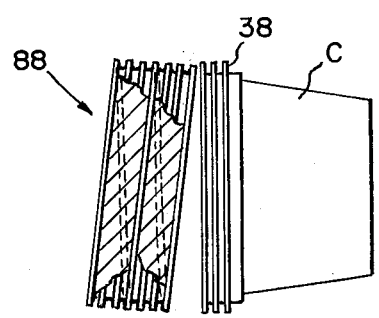
FIG. 4 is an enlarged top plan view of the rim folding roll and several nested containers.

In the operation of the apparatus, a stack S of nested containers C is fed to the machine by the conveyor 32 so as to pass through the end plate opening 22a open end foremost. The rims 38 are tangentially engaged by the drive rolls 56 and 53 with sufficient friction to rotate the containers C while concurrently forwarding them axially through the heating unit 42 where the flanges 38 are supported by the guide rods 50 and concurrently heated by the heating coils 48 to a softened state so as to be readily deformable. The orientation of the rolls 56 can be adjusted to control the feed rate. From the heating unit 42, the containers C are driven forwardly by the drive rolls 56 to the space defined by the compressing rolls 86 and the rim curling member 88. As can be seen in FIG. 4, the lead ends 90B, 91B and 92B of the grooves 90, 91 and 92 at the innermost end 88b of the curling roll 88 are circumferentially spaced 120°. The position of the belt supporting rolls 78 and the container support belt portion 57a are such that the central belt portions 57B most securely grip the axially forwarded rims 38, however, due to radial compression of the rims 38 by the belt 57 the rims 38 are gripped along a substantial greater axial width portion of the belt portion to force the rims 38 into successive ones of the slots 90, 91 and 92 and progressively curl or fold the rims 38 upon themselves to provide a substantially uniform, rounded, peripheral bead. Because the groove portions 90A, 91A and 92A receiving the rims 38 lie in planes substantially perpendicular to the axis c of the stack S, and because they are fed mouth first so that the flanges 38 can easily buckle at the junction 38B, the containers c are not forced axially rearwardly by the flights 118 but rather, the flights 118 tend to force the flanges to a folded position and easily enter the grooves. Upon one completed rotation of a container rim 38 received in the slot 90, 91 or 92, the folding is complete and the beaded rim 38A (FIG. 14) will follow along the length of the groove to cool the heated rim 38A so that it will set in the folded position.

If desired, the frame F can be swung about the axis 14 to the position illustrated in chain lines in FIG. 1 so that gravity will aid the axial flow of containers to the rim curling zone.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

The terminal rim portion 38c which tangentially engages the rout of the groove is substantially immediately folded inwardly toward the container side wall to the position illustrated in FIG. 14 in which the terminal rim portion 38c overlies or axially confronts another rim portion 38d.

What I claim is:

1. Apparatus for forming deformable projecting rims or flanges provided on individual containers of a stack of nested containers or the like comprising:
   a frame;
   means on said frame for heating the rims to a deformable state at a rim heating station;
   rim forming roller means, rotatably mounted on said frame about an axis, having spiral rim forming groove means for receiving and forming the heated rims therein at a rim forming station;
   means for rotating said rim forming roller means; and
   movable compressing belt means including at least a portion extending curvilinearly about and proximate to a peripheral portion of said forming roller means to receive said containers and traveling in a curvilinear path so as to peripherally engage said containers and maintain said rims in said groove means under such force as to effect conjoint rotation and relative axial movement of said containers and said rim forming roller means.

2. The apparatus as set forth in claim 1 wherein said belt means includes an endless belt trained around rollers which are rotatable about their longitudinal axes.

3. The apparatus as set forth in claim 2 wherein said groove means has a predetermined helix angle, said longitudinal axes lying in planes which are perpendicular to radial planes intersecting the axis of said stack, said longitudinal axes being axially inclined, relative to said radial planes and at angles equal to one-half said helix angle.

4. The apparatus as set forth in claim 1 wherein a temperature controlled roll, longitudinally coextensive with said heating means, is provided for supporting said stack of containers, and means mounting said temperature controlled roll for rotation about its axis to rotate said stack, and means for cooling said temperature controlled roll.

5. The apparatus as set forth in claim 1 including additional means upstream of said heating station circumferentially spaced from said temperature controlled roll for aiding the rotation of said stack while concurrently forwarding said stack.

6. The apparatus as set forth in claim 5 wherein said additional means comprises roller means rotating about an axis angularly inclined to the axis of said stack, said temperature controlled roll rotating about an axis parallel to the axis of said stack.

7. The apparatus as set forth in claim 1 including a pair of diametrically opposed drive rolls upstream of said heating station for peripherally engaging said containers to rotate and forward said stack, and means adjustably mounting said opposed drive rolls such that the rotational axes of said opposed drive rolls are angularly adjustable to control the axial feed rate of said stack.

8. The apparatus as set forth in claim 1 include a base, and means mounting said frame for pivotal movement on said base to an inclined position in which said heating means is elevated relative to said rim forming roller means so that gravity aids the axial movement of said containers in a forward path.

9. The apparatus as set forth in claim 5 wherein said containers have open ends adjacent said rims or flanges and stack supplying belt means for feeding said stack axially forwardly through said stations with the open container ends foremost while said temperature controlled roll rotates said stack about its axis.

10. The apparatus as set forth in claim 9 including a pair of dimetrically opposed drive rolls upstream of said heating station for tangentially engaging said containers to rotate and forward said stack, and means adjustably mounting said opposed drive rolls such that the rotational axes of said opposed drive rolls are angularly adjustable to control the axial feed rate of said stack.

11. The apparatus as set forth in claim 1 wherein said rim forming roller means comprises a rim forming roller member, rotatable about a longitudinal axis having a plurality of spiral, rim forming grooves about the periphery thereof for receiving the rims of successive stacked containers.

12. The apparatus as set forth in claim 11 including means mounting said roller member such that the portions of said grooves receiving said rims lie in generally parallel planes perpendicular the axis of said stack.

13. The apparatus as set forth in claim 11 wherein said rim roller means comprises a single rim forming roller member having more than one groove in the outer surface thereof.

14. The apparatus as set forth in claim 1 wherein said containers are each open at one end adjacent said rim or flange, means for axially feeding said stack including means for feeding said stack such that the containers are supplied open end first through said stations.

15. The apparatus as set forth in claim 1, wherein the portion of said belt means engaging said stack travels in a helical path of travel to rotate and concurrently forward said stack as the container rims are being formed.

16. The apparatus as set forth in claim 1 wherein the width and depth of said groove means remains constant throughout the length of said groove means.

17. The apparatus as set forth in claim 1 wherein said rim forming roller means comprises rim folding means for folding each heated rim radially inwardly to a position axially confronting another portion thereof, the entire rim being turned over on itself upon completion of one revolution of said container rim which is received in said groove means.

18. The apparatus as set forth in claim 1 wherein said rim forming roller means comprises only one rotatable folding roll rotatable about an axis inclined to a radial plane intersecting the axis of the stack as an angle equal to the helix angle.

19. Apparatus for forming deformable projecting rims or flanges provided on individual containers of a longitudinal stack of nested containers or the like having a longitudinal axis comprising:
a frame;
means on said frame for heating the rims to a deformable state at a rim heating station;
rim forming roller means, rotatably mounted on said frame about an axis, having spiral rim forming groove means for receiving and forming the heated rims therein at a rim forming station;
means for rotating said rim forming roller means; and
movable compressing belt means positioned about a portion of said forming roller means a distance and traveling in a path transverse to the axis of said stack so as to peripherally engage said containers and maintain said rims in said groove means under such force as to effect conjoint rotation and relative axial movement of said containers and said rim forming roller means.

20. Apparatus for forming deformable projecting rims or flanges provided on individual containers of a stack of nested containers or the like comprising:
a frame;
means on said frame for heating the rims to a deformable state at a rim heating station;
rim forming roller means, rotatably mounted on said frame about an axis, having spiral rim forming groove means for receiving and forming the heated rims therein at a rim forming station;
means for rotating said rim forming roller means; and
movable compressing belt means, positioned about a portion of said forming roller means to receive said containers and traveling in a path so as to peripherally engage said containers, for maintaining said rims in said groove means and for effecting rotation and axial movement of said containers.

* * * * *